Dec. 6, 1966   D. C. BUSCALL, JR   3,289,260
INSULATED WIRE AND CABLE CLAMP
Filed Aug. 11, 1965   2 Sheets-Sheet 1
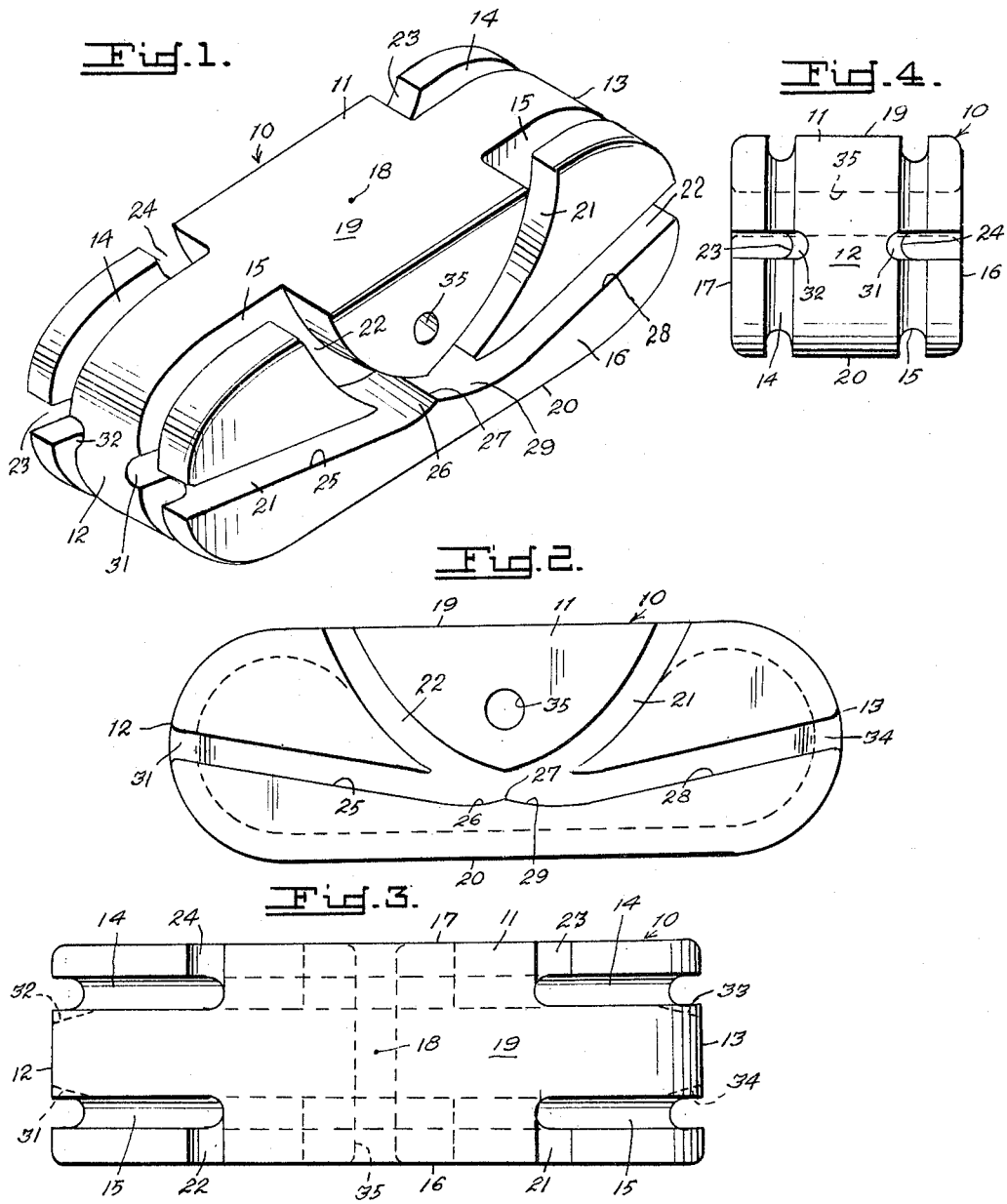
INVENTOR
David C. Buscall, Jr.
BY Harry M. Saragovitz,
Edward J. Kelly &
A. J. Dupont
ATTORNEYS.

Dec. 6, 1966     D. C. BUSCALL, JR     3,289,260
INSULATED WIRE AND CABLE CLAMP
Filed Aug. 11, 1965     2 Sheets-Sheet 2
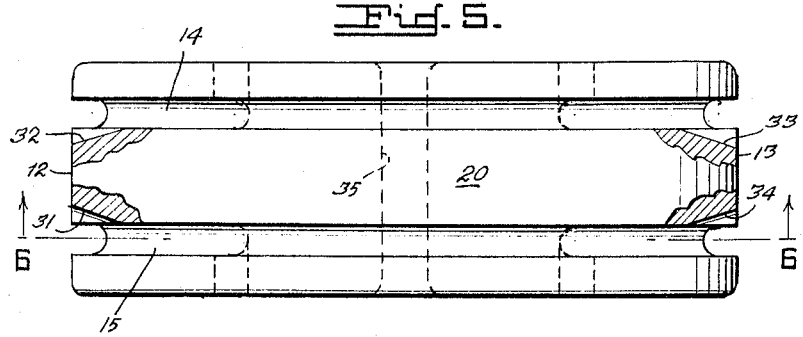
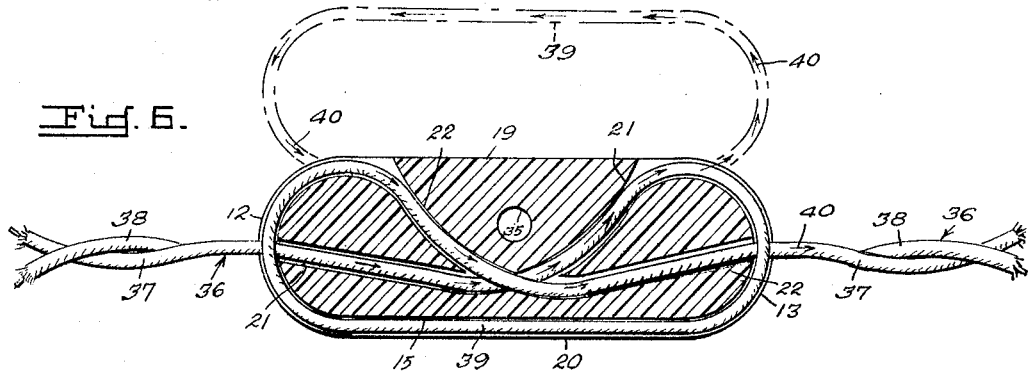
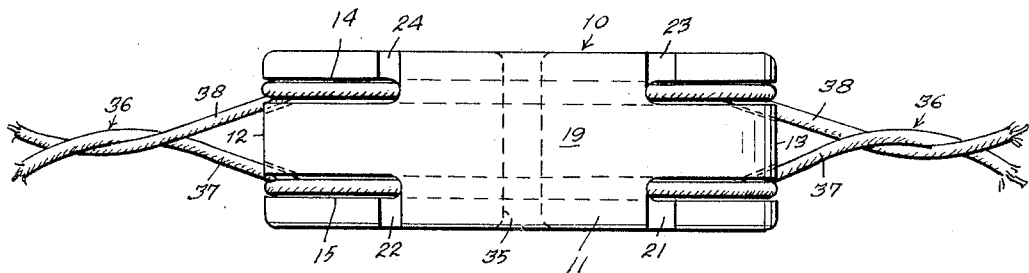
INVENTOR
*David C. Buscall, Jr.*
BY: *Harry M. Saragovitz,*
*Edward J. Kelly &*
*A. J. Dupont*     ATTORNEYS.

United States Patent Office 3,289,260
Patented Dec. 6, 1966

3,289,260
INSULATED WIRE AND CABLE CLAMP
David C. Buscall, Jr., Sierra Vista, Ariz., assignor to the United States of America as represented by the Secretary of the Army
Filed Aug. 11, 1965, Ser. No. 479,023
8 Claims. (Cl. 24—129)

The invention described herein may be manufactured and used by or for the Government for governmental purposes, without the payment to me of any royalty thereon.

This invention relates to an insulated wire and cable clamp for use in fastening communication wire or cable and more particularly to a self-locking insulated, unitary clamp, capable of fastening a twisted pair of wires or cables rigidly, without slippage and without damage, to the wire or cable insulation.

The clamp of the present invention may be used for suspending aerial spans of wire or cable between trees, poles or other elevated structures in aerial field construction; or for providing a means for attaching the line wire to a wire-dispenser cover for the purpose of ejecting the empty cover from an aircraft wire dispenser set, while the wire is being payed out at high speed, and for absorbing the initial shock developed during the ejection of the empty line wire cover.

The military need for rapidly installing wire and cable circuits in the field under combat conditions has been well established and can usually be satisfied by laying wire or cable from fixed-wing or rotary-wing aircraft.

Equipment for providing such an airlay facility for wire is covered by U.S. Patent No. 3,054,574. The function contributing most to the success of the present airlay system is the technique of reloading wire into the aircraft wire dispensing chutes during flight.

To make this technique possible, a method of ejecting empty wire dispenser containers from the aircraft dispensing chute when all wire in the container has been payed out, is used. This method is effected by double-taping a short looped section of salvage-wire to the standing end of the line-wire and fastening the two ends of the salvage-wire to the "D" ring on the outside of the wire container. This allows the line-wire to eject the empty container from the dispensing chute. The double taped section between the line-wire and salvage-wire will absorb most of the inertial shock.

During Arctic test of the aircraft wire dispenser set, it was found that the method of ejection requiring the use of friction tape and salvage-wire to fasten the container to the standing end of the line-wire could not be used reliably in the Arctic environment because the friction tape freezes, becomes brittle and snaps off, thereby failing to eject the empty wire dispenser.

The clamp of this invention enables replacement of the friction tape and salvage-wire for use in the ejection of the empty canvas wire containers. A wire properly placed into the grooves in the clamp is locked into place by the groove configuration restraining the wire from slipping without causing any damage to the wire insulation. A nylon cord inserted through a center hole in the clamp and attached to the "D" ring on the dispenser cover, serves to eject the container with the line, and provides the necessary absorption of inertial shock.

To reduce time requirements for the installation of wire circuits in combat, the wire is usually laid on the ground initially, and elevated at points where it is necessary to effect overhead crossings over major obstacles such as roads, rivers, valleys, etc. When time permits, these lines are not laid on the ground but are elevated on trees, existing poles or other elevated structures by series of wire ties. The wire tie places a tight knot into the wire causing a pressure and friction point between the two conductors of the circuit. After a period of time, a combination of the elements, rain, sun and wind caused a decrease of the insulation resistance at these points which impaired the circuit and the range of its transmission.

The clamp of this invention prevents the aforesaid difficulties.

It is therefore an object of this invention to provide a molded, insulating clamp incorporating imbedded grooves therein into which wires or cables may be placed and locked into place to prevent the wire or cable from slipping.

It is another object to provide a clamp cable of fastening a pair of twisted wires or cables rigidly.

A further object is to provide a molded clamp adapted to suspend wire or cable between trees, poles or other elevated structures.

A still further object is to provide a one-piece insulating clamp for wires and cables that is self-locking to prevent slippage or damage to the wire or cable.

A final object is to provide a one-piece, insulating clamp that is cheaply manufactured and simple to use.

These and other objects and advantages of the present invention will be fully apparent from the following description when taken in connection with the annexed drawing, in which:

FIG. 1 is a perspective view of the wire and cable clamp of this invention;
FIG. 2 is a side view thereof;
FIG. 3 is a top plan view of the clamp;
FIG. 4 is an end view of the clamp;
FIG. 5 is a bottom view thereof;
FIG. 6 is a longitudinal section view taken along line 6—6 of FIG. 5, looking in the direction of the arrows, and showing a twisted wire therein; and,
FIG. 7 is a top view of the clamp and showing a pair of twisted wires clamped therein.

Referring in detail to the drawings, reference character 10 indicates generally the clamp of the invention. Clamp 10 defines a substantially rectangular body 11 having rounded ends 12 and 13.

All edges are rounded.

Body 11 is provided with a pair of identical, spaced, parallel grooves 14 and 15. These grooves are disposed a distance inward from the sides 16 and 17 of body 11. Each of the grooves 14 and 15 begin at, for example, a point equidistant from a central point 18 on the top side 19 of body 11 and end 12, around end 12, along bottom 20, around end 13, along top 19 to terminate at a point also equidistant between central point 18 and end 13.

Body 11 is further provided on each side 16 and 17 with a set of symmetrically contoured grooves which intersect one another and are cut in the sides of body 11 to a distance equal to the inside wall of grooves 14 and 15. Each set begins and ends in a horizontal plane intersecting the body 11 medially. The set on one side is identical with the set on the other side so one set only need be herein described, for example, the set on side 16 is the most fully illustrated in the drawings and consists of a first groove 21 which begins at a medial point at the end 12 of body 11 and in communication with groove 15 and extends downward as at 25, upward as at 26 to a point 27 located half way of the length of body 11 and continues to curve upwardly to communicate with groove 15 at its terminal nearest to end 13.

A second groove 22 communicating with groove 15 at end 13 extends downward at 28, then upwardly to intersect groove 21 at point 27 and continues to curve upwardly to communicate with the terminal of groove 15 nearest the end 12.

The set of grooves on side 17 of body 11 are indicated by 23 and 24.

Grooves 14 and 15 are beveled inwardly as at 31, 32, 33 and 34 for a purpose to be obvious later.

A transverse bore 35 in body 11 provides a means for securing clamp 10 to poles, trees, etc.

FIGS. 6 and 7 illustrate a twisted wire 36 clamped securely by clamp 10 and shows one strand of the wire 36 in grooves 15, 21 and 22. The other strand of wire 36 is clamped in grooves 14, 23 and 24.

The method of placing one strand 37 of wire 36 is as follows: Strand 37 is placed in groove 21, looped over as indicated in broken lines as at 39 then placed in groove 22 as indicated by the flow arrows 40. Then the loop 39 is turned downward and slipped into groove 15 along end 12, bottom 20 and end 13. The ends of strand 37 are pulled in opposite directions which tighten the wire 36 as shown in full lines. Tapers 31–34 constitute the locking feature of the clamp. The loops of wire in grooves 14–15 places more pressure on the section of wire in grooves 13–34 as the strain is increased on the wire ends. The depth of the grooves limit the pressure on the wire and prevents insulation abrasion.

If the clamp is to be fastened to a pole, tree, etc., a nail or screw is passed through bore 35.

If the clamp is to be tied to a tree branch or other object, a piece of salvage wire or a cord is used through bore 35.

Clamp 10 may be fabricated in different shapes, depending on the particular requirements. For instance, the clamp may be round and a vertical bore (not shown) instead of the transverse bore 35 will permit it to be used as an insulating clamp on a telephone pole.

Two clamps may be fastened together with a length of nylon cord to relieve strain and absorb shock from a splice or cable connector located between the two clamps.

Three wire lamps may be employed when used as an expedient method of improvising doublet antennas.

The clamp 10 may be fabricated from almost any rigid or semirigid insulating material depending on the required use, such as polyester resin and reinforced with glass fibers.

While only a preferred form of the invention is shown and described, other forms of the invention are contemplated and numerous changes and modifications may be made therein without departing from the spirit of the invention as set forth in the appended claims.

What is claimed is:

1. A wire and cable clamp comprising a one piece body having a pair of spaced, parallel grooves set therein, said grooves extending around a greater portion of said body and a pair of identically contoured and intersecting grooves set in each side of said body and each said pair communicating with a said parallel groove at their terminals.

2. A wire and cable clamp comprising a one piece body having a pair of spaced, parallel grooves extending longitudinally from a point spaced from a central point on the top side of said body, around said body and terminating at a point on the top side of said body spaced from said central point and a set of identical, intersecting grooves set in each side of said body and each said intersecting groove being in communication with one of said longitudinal grooves.

3. A wire and cable clamp as claimed in claim 2 wherein said pairs of grooves on each side of said body are set in the sides of said body to a distance sufficient to permit communication between their terminals with said spaced parallel grooves.

4. A wire and cable clamp comprising, a one piece block having a pair of spaced, parallel grooves set in said body and extending from a point spaced from a central point on the top of said body, around said body and terminating at a point spaced from said central point on the top of said body and a pair of symmetrically contoured, intersecting grooves set in each side of said body, each groove in each side of said body extending from and in communication with one of said parallel grooves at a medial point of an end of said body and terminating at, and in communication with a terminus of the same parallel groove.

5. A wire and cable clamp comprising, a molded body having a pair of spaced parallel grooves set in said body and being spaced inward from the sides thereof, said grooves extending from a point equidistant from a central point on the top side of said body and an end thereof and extending longitudinally around said body to terminate at another point equidistant between said central point and the other end of said body and a pair of symmetrically contoured grooves set in each side of said body, each groove in each pair being in communication with a said parallel groove at its ends thereof.

6. A wire and cable clamp as claimed in claim 5 wherein said pairs of grooves on the sides of said body are set inward to a distance to permit communication with a respective parallel groove at their terminals.

7. A wire and cable clamp as claimed in claim 5 wherein said grooves set in each side of said body intersect each other at a point equidistant between the ends of said body and below its longitudinal axis thereof.

8. A wire and cable clamp as claimed in claim 5 wherein each said groove in each side of said body is contoured to follow a path extending medially of an end thereof, and in communication with a said parallel groove, for a distance downward therefrom, then curving upward to terminate in communication with a terminus of the same parallel groove on the top of said body.

References Cited by the Examiner

UNITED STATES PATENTS

| | | | |
|---|---|---|---|
| 343,849 | 6/1886 | Pond. | |
| 533,402 | 1/1895 | Trester | 24—129 |
| 2,345,890 | 4/1944 | Daniels | 24—129 |

BERNARD A. GELAK, *Primary Examiner.*